United States Patent Office 3,337,189
Patented Aug. 22, 1967

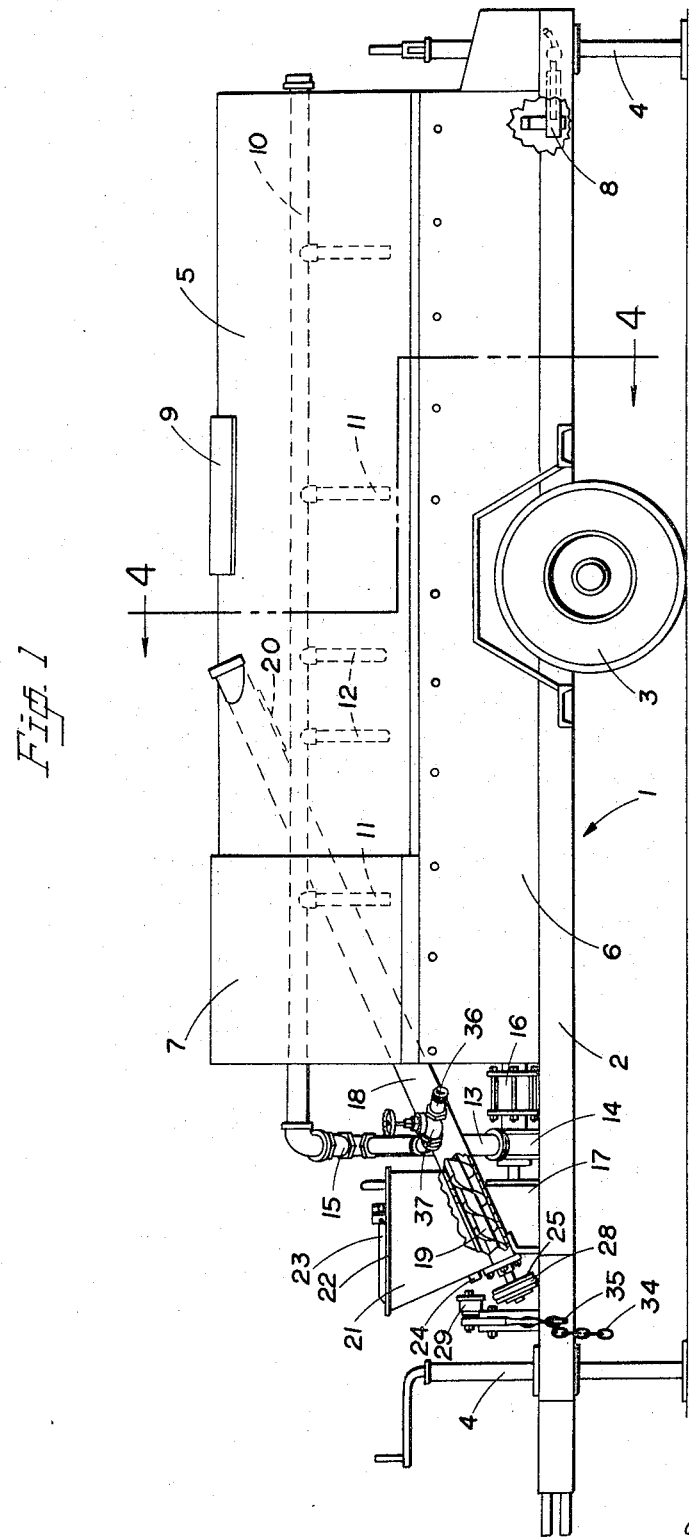

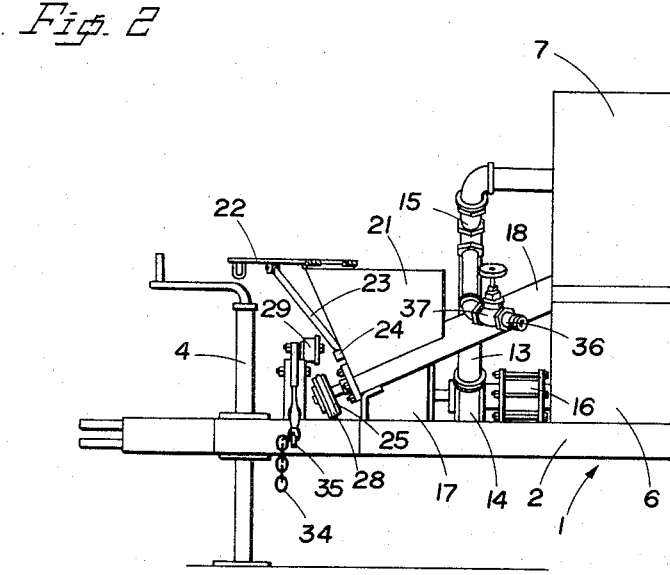
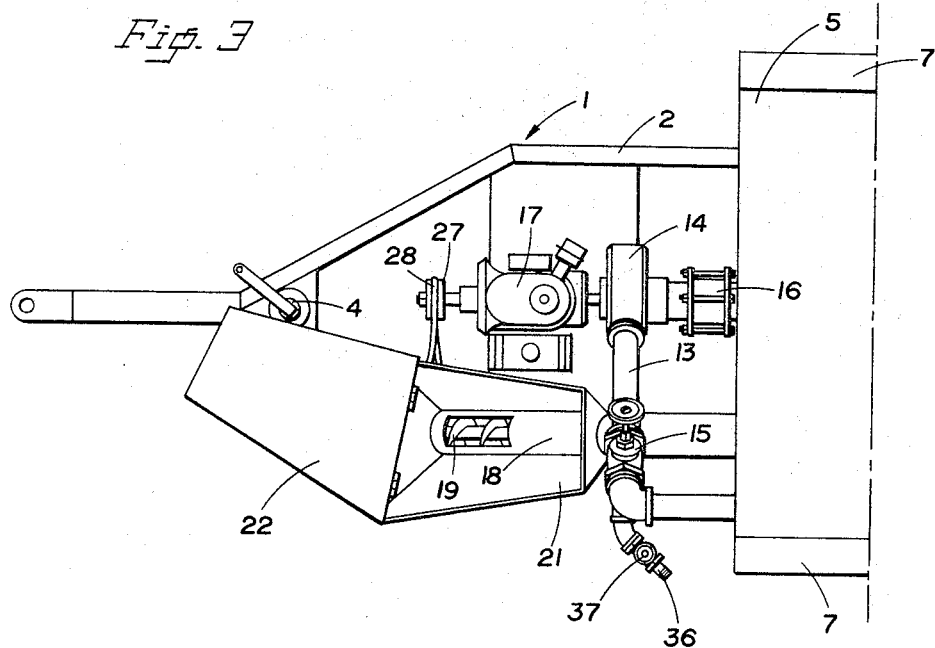

3,337,189
LIME-SULPHUR MIXING MACHINE
John W. Brown, 438 W. Harter, Visalia, Calif. 93277, and Robert C. Soults, 3561 W. Inyo, Tulare, Calif. 93274
Filed Sept. 27, 1965, Ser. No. 490,530
3 Claims. (Cl. 259—4)

ABSTRACT OF THE DISCLOSURE

An apparatus for the preparation of a water solution of lime and sulphur, for insecticide, fungicide and similar purposes, by means of a water circulating system functioning within a closed tank and having a certain definite relationship to the point at which the initially dry materials are fed into the tank.

---

Heretofore, such a solution has been difficult to prepare to a condition of substantially complete admixture in the solution of the initially dry or powdered lime and sulphur; this due to the inherent ability of lime and sulphur (particularly the latter) to repel or resist moisture.

It is, therefore, the major object of this invention to provide a novel machine operative to produce a water solution of lime and sulphur in an efficient and effective manner.

Another important object of the invention is to provide a machine, for the purpose described, which includes a tank, the initially dry lime and sulphur being fed into the tank from above and into a quantity of heated water therein by means of a hopper and auger conveyor assembly, and the water—together with the lime and sulphur—then being forcefully circulated and agitated in a manner to produce a thoroughly mixed solution.

An additional important object of the invention is to provide the machine with a solution circulating system having a novel arrangement of nozzles which discharge downwardly in the tank from the upper part thereof and create a most effective solution agitating or boiling action in said tank and which action greatly aids in the mixing of such solution.

Another object of the invention is to provide a machine, for the purpose described, constructed so that the desired solution is obtained without the aid of an enclosed pressure-tight vessel, or of the use of hydrogen sulphide; this resulting in safer and more efficient operating conditions than would otherwise be the case.

A further object of the invention is to provide a lime-sulphur mixing machine which is designed for ease and economy of manufacture, and convenience of operation.

A still further object of the invention is to provide a practical, reliable, and durable lime-sulphur mixing machine and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the improved lime-sulphur mixing machine, showing the lid of the hopper in closed position.

FIG. 2 is a fragmentary side elevation of the machine, showing the lid of the hopper in open position.

FIG. 3 is a fragmentary top plan view of the same.

Figure 4:
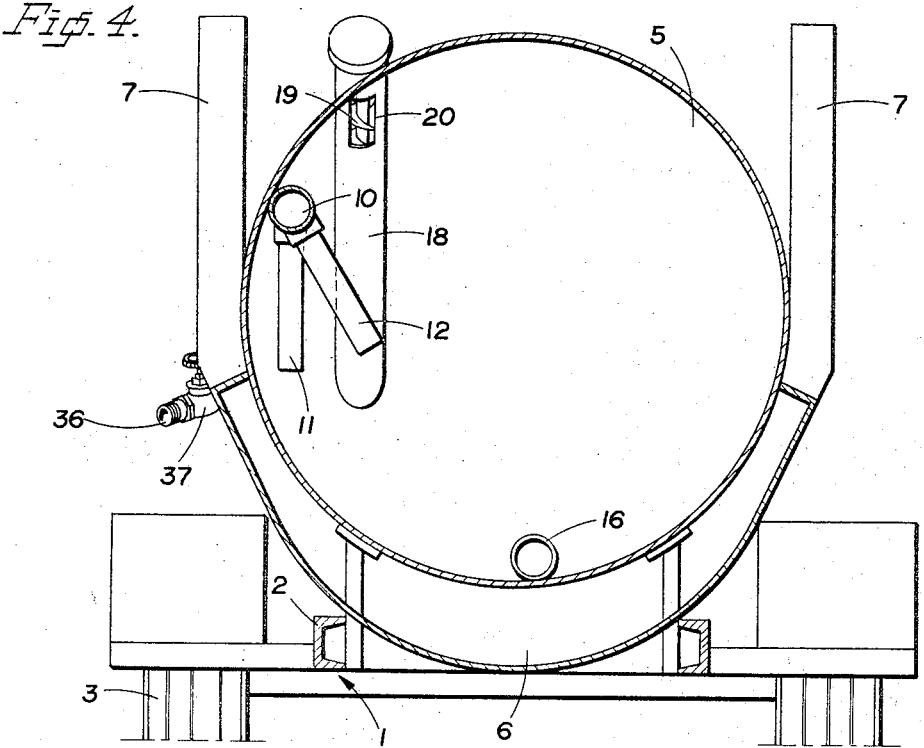
FIG. 4 is an enlarged cross section of the machine taken on line 4—4 of FIG. 1.
Figure 5:
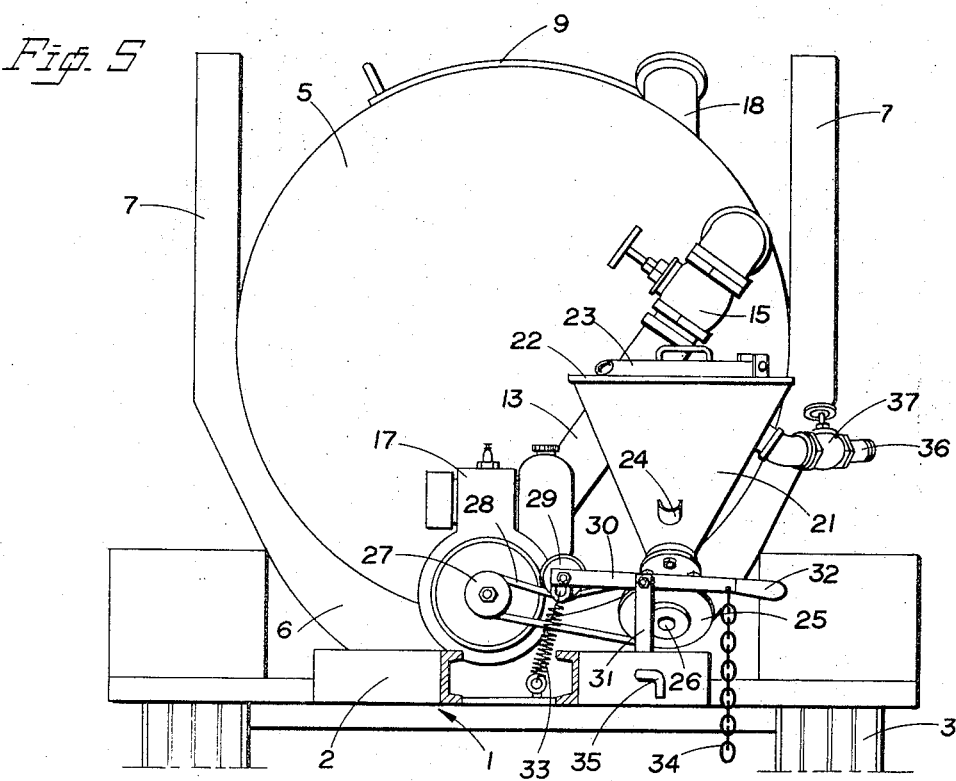
FIG. 5 is a front end elevation of the machine.

Referring now more particularly to the drawings and to the characters of reference marked thereon, the machine comprises a main frame, indicated generally at 1, which is adapted at its forward end for connection to a tractor or other towing vehicle. The frame consists mainly of a pair of elongated transversely spaced beams 2, and is supported intermediate its ends by a pair of wheels 3. The frame is maintained in a level position when disengaged from the tractor by hand-operated jacks 4 mounted on said frame ahead and rearwardly of the wheels.

Mounted on the frame 1 is an elongated horizontal-axis tank 5, preferably of circular form in cross section as shown. A firebox 6 is provided with the tank and extends from end to end thereof and about the lower portion of the same; said firebox having upstanding flues 7 at its forward end at the sides of the tank. Oil burners 8 or the like project into the firebox at its rear end, so that the water (or solution) in the tank during a mixing operation can be kept in a heated condition. A normally closed hatch 9 on the top of the tank provides for the easy initial filling of the tank with water to the desired depth.

Disposed in and extending the full length of the tank 5 adjacent one side thereof and above the normal water level is a pipe or manifold 10 which is closed at its rear end. Depending from the pipe 10 in spaced relation along the same are nozzles or jets 11 parallel to each other and disposed substantially tangentially of the adjacent side wall of the tank. Between certain adjacent ones of the nozzles 11, a similar pair of spaced nozzles 12 also depend from the pipe 10. The nozzles 12, however, are disposed at a laterally inward angle relative to a vertical plane and to the nozzles 11, as shown in FIG. 4, so as to discharge into the tank at a point laterally inward of the point of discharge of the nozzles 11, or toward the bottom of the tank.

The pipe 10, immediately ahead of the tank 5, is connected to a downwardly projecting pipe 13 coupled to the discharge side of a rotary type pump 14 mounted on the frame 1; the pump being disposed with its axis horizontal and lengthwise of the frame. A hand-operated valve 15 is interposed in the pipe 13 to open and close the same. Another pipe 16 leads from the front end of the tank 5 adjacent the bottom thereof to the intake end of the pump 14. The rotor of the pump is directly connected to the shaft of an internal combustion engine 17 mounted on the frame 1 ahead of said pump.

Extending lengthwise into the tank 5 from a point some distance ahead of the same is the casing 18 of an auger conveyor 19. Such casing 18 is disposed at an upward angle to a rear end termination at the top of the tank on the side thereof near pipe 10. The flight of this conveyor is arranged relative to the direction of rotation of the engine 17 (to which said conveyor is operatively connected as will be hereinafter described) so as to deliver material into the tank through an opening 20 in the casing 18 adjacent the upper end thereof but within said tank.

At its forward and lower end—which is outside the tank 5—the top of the conveyor casing 18 opens into the bottom of an upstanding material receiving hopper 21 of upwardly flaring straight-sided form. A cover or lid 22 for the hopper is hingedly mounted thereon adjacent its forward end at such a transverse angle that when opened and swung forwardly to a horizontal position, said lid will lie at somewhat of an angle toward the opposite side of the machine, as shown in FIG. 3. A brace arm 23 is hinged on the initially upper side of the lid 22 adjacent its then rear end; said arm, when the lid is open, being adapted to seat at its free lower end in a socket 24 on the forward side of the hopper, as shown in FIG. 2. This braces the hopper lid when open and holds the same against downward movement or deflection.

In order to drive the auger conveyer 19, a grooved pulley 25 is mounted on the forward end of the axial shaft 26 of said conveyor, and which end is ahead of the forward end of the engine 17. A similar but smaller pulley 27 is mounted on the forward end of the engine shaft in alinement with the pulley 25. An endless belt 28 connects the pulleys; said belt being capable of considerable slack. An idler pulley 29 engages the upper run of the belt 28 intermediate its ends and said pulley is mounted on one end of an arm 30 which is pivoted intermediate its ends on a bracket 31 upstanding from the frame 1. The arm 30 extends transversely of the frame and at the end opposite pulley 29 is formed with a handle 32. A tension spring 33 connects between the arm 30 adjacent the pulley 29 and the frame 1 to maintain the belt 28 taut and in driving engagement with the pulleys 25 and 27. When the handle 32 is depressed and the pulley thus raised, the belt 28 becomes slack and the pulley 25 will not be driven. The handle 32 may be maintained in such depressed position by means of a link chain 34 depending from the arm 30 outwardly of the frame 1 and adapted to be releasably engaged with a catch element 35 projecting from the frame. The above arrangement thus provides, in effect, a clutch.

A mixture or solution discharge spout 36 projects from the pipe 13 at a suitable point below the valve 15; said spout 36 having a normally closed hand-operated valve 37 interposed therein.

In operation, when the machine is in a stationary position and with the jacks 4 set to maintain the tank 5 level, water is poured into the tank to substantially half fill the same. The burners 8 are then operated for a sufficient period to cause such water to be heated to approximately 180 degrees Fahrenheit. Thereafter, with the valve 15 fully opened and the valve 37 closed, the engine 17 and pump 14 are placed in operation; this resulting in a continuous circulation of the water from the tank, through the pump and pipe 10, and thence from the nozzles 11 and 12 back to the tank.

The feed auger 19 is then put into operation, while bags of sulphur and lime are alternately emptied into the hopper 21 until the desired total amount for the quantity of water involved has been fed into the tank by the auger conveyor 19 and from opening 20. The bags in which the materials are initially contained are individually placed on the open hopper lid 22 so as to be supported thereby while the material is being emptied from each bag into the hopper. The lid 22 is purposely angled—when in an open position—toward the center of width of the machine so that the weight of a heavy bag (100 pounds or more) when placed on said lid will not tend to laterally tilt the forward end of the machine and which is supported by a single jack.

After all the lime and sulphur has been fed into the tank, and the operation of the auger has been stopped, the pump is operated for an additional period of time in order to circulate and agitate the solution, and to reduce any foam in said solution that might have developed.

It will be noted that as the solution is circulated by the pump and discharges downward into the tank through the relatively restricted nozzles 11 and 12, such solution impinges with considerable force against the adjacent curving side wall of the tank (to cause a swirling agitation) as well as against the bottom of the tank (to prevent settling of the solids).

Further, the two angled nozzles or jets 12 are so disposed relative to the discharge opening 20 of the auger conveyor casing 18 that the solution discharging under pressure from said nozzles 12 will create an undertow at the point of drop-in from the opening 20 of the very buoyant powdered lime and sulphur. This will subject such materials to an immediate submerging and wetting action, and substantially aids in the mixing operation.

The use of an auger conveyor for discharging the powdered material into the tank insures that such material will be fed in an even and relatively restricted stream, even though such materials may be dumped into the hopper in large quantities at a time.

By reason of the circulating and agitating action of the machine, as above described, a lime-sulphur solution can be produced in an expeditious manner.

Whenever it is desired to withdraw the mixture or solution from the tank, the valve 15 is closed and the valve 37 is opened. Operation of the pump 14 will then cause the solution to be drawn from the bottom of the tank and passed through the spout 36 into a receiving vessel or to a hose coupled to said spout. For direct field application the hose may have a nozzle on its outer end.

While the machine is here shown and described as being portable and wheel-mounted, it may also be arranged as a stationary device and mounted in a permanently fixed position without any wheels and jacks being involved in its construction.

From the foregoing description, it will be readily seen that there has been produced such a lime-sulphur mixing machine as substantially fulfills the objects of the invention, as set forth herein.

While this specification sets forth in detail the present and preferred construction of the lime-sulphur mixing machine, still in practice such deviations from such detail may be resorted to as do not form a departure from the spirit of the invention, as defined by the appended claims.

Having thus described the invention, the following is claimed as new and useful and upon which Letters Patent is desired:

1. A lime-sulphur mixing machine comprising a horizontally extending tank to contain water to a level a distance below the top of the tank, means to discharge dry lime and sulphur into the tank above the water level, and means to agitate the water in the tank; said first named means comprising an enclosed auger conveyor projecting into the tank from outside the same, a material receiving hopper emptying into the outer end of said auger conveyor, the top of the hopper lying in a substantially horizontal plane, a lid for the hopper, means hinging the lid at one end on the hopper for opening movement to a substantially horizontal position, a brace arm hinged on the lid adjacent the other end thereof for depending angular movement therefrom, and a socket on the corresponding end of the hopper to removably receive the free end of the brace arm.

2. A structure, as in claim 1, in which the hopper and lid extend lengthwise of the machine, and the lid is hinged at a transverse angle such that when the lid is opened, it slopes laterally inward of the machine.

3. A lime-sulphur mixing machine comprising a horizontally extending tank of substantially circular form in cross section to contain water to a level a distance below the top of the tank, means to discharge dry lime and sulphur into the tank adjacent the top and at a point intermediate the ends thereof, a longitudinally extending pipe in the tank above the level of the water and disposed adjacent one side of the tank, a plurality of nozzles depending from the pipe in spaced relation along the same, and means to circulate water from the tank into the pipe and to force such water under pressure back into the tank through the nozzles; certain of the nozzles being arranged to discharge water against said side of the tank below water level and a pair of such nozzles being arranged to discharge in the direction of the bottom of the tank, the point of discharge of the lime and sulphur into the tank being between said pair of nozzles.

References Cited

UNITED STATES PATENTS

| | | | |
|---|---|---|---|
| 895,795 | 8/1908 | Sampson | 259—4 |
| 1,157,092 | 10/1915 | Du Rell | 259—95 X |
| 2,281,974 | 5/1942 | Herr | 259—25 |
| 2,633,383 | 3/1953 | Marmor | 259—95 |
| 2,988,286 | 6/1961 | Snyder et al. | 239—127 X |
| 3,166,300 | 1/1965 | Richter | 259—4 |

WILLIAM I. PRICE, *Primary Examiner.*

WALTER A. SCHEEL, *Examiner.*

J. M. BELL, *Assistant Examiner.*